United States Patent [19]

Hecht et al.

[11] Patent Number: 5,014,281
[45] Date of Patent: May 7, 1991

[54] GAS LASER

[75] Inventors: Hartmuth Hecht, Southbridge, Mass.; Wolfgang Paul, Schlagenhofen; Anton Baumgartner, Niederroth, both of Fed. Rep. of Germany

[73] Assignee: Coherent, Inc., Palo Alto, Calif.

[21] Appl. No.: 452,756

[22] Filed: Dec. 19, 1989

[30] Foreign Application Priority Data

Dec. 21, 1988 [EP] European Pat. Off. ........... 88121412

[51] Int. Cl.$^5$ ................................................ H01S 3/22
[52] U.S. Cl. .......................................... 372/59; 372/58
[58] Field of Search ..................................... 372/59, 58

[56] References Cited

U.S. PATENT DOCUMENTS

| 3,723,902 | 3/1973 | Patel | 331/94.5 |
| 3,885,543 | 12/1974 | Timmermans et al. | 331/94.5 |
| 4,229,709 | 10/1980 | McMahan | 372/59 |
| 4,316,157 | 2/1982 | Dosi et al. | 372/59 |
| 4,393,506 | 7/1983 | Laakmann et al. | 372/59 |
| 4,514,698 | 4/1985 | Blumenthal et al. | 372/59 |
| 4,803,693 | 2/1989 | Schramm | 372/59 |

Primary Examiner—Leon Scott, Jr.
Attorney, Agent, or Firm—Limbach, Limbach & Sutton

[57] ABSTRACT

A gas laser includes a laser gas circuit having a by-pass line. The by-pass line includes a condenser for removing water vapor. During normal operation, the laser gas flows through the by-pass line as well as through the remaining portion of the laser gas circuit so that the water vapor portion in the laser gas flowing through the by-pass line is partly removed by the condenser. For the purpose of defrosting the condenser, the by-pass line is isolated from the rest of the laser gas circuit and, if required, is evacuated several times and rinsed with fresh laser gas. During normal operation, the gas laser can be operated with a substantially lower fresh gas supply than piror art circulating lasers.

9 Claims, 2 Drawing Sheets

GAS LASER

TECHNICAL FIELD

The invention relates to a circulating gas laser having a resonator located in a laser gas circuit.

BACKGROUND OF THE INVENTION

Circulating gas lasers found in the prior art require a feed line and an outlet line for the laser gas to be exchanged. In a gas laser of that kind, the laser gas in the laser gas circuit is circulated by means of a circulation pump, e.g. a Roots pump, and the laser gas to be exchanged is sucked off through the outlet line by a further pump. In a typical $CO_2$ high-performance laser, a pressure of 120 to 135 millibars is present on the high-pressure side of the laser gas circuit, i.e., between the Roots pump and the resonator. One problem that is encountered is that gas from the environment penetrates into the laser gas circuit due to leakage. This gas which leaks into the system impairs laser efficiency. For this reason, in the prior art, fresh gas is supplied to the laser gas circuit and a corresponding amount of laser gas is evacuated from the laser gas circuit. In this manner, the composition of the laser gas in the laser gas circuit is maintained on a purity level at which the laser output power is maximized.

The consumption of fresh gas is an essential cost factor in the operation of such gas lasers. Therefore, it is desirable that the fresh gas consumption be kept as low as possible. In the prior art, there have been attempts to purify the laser gas and remove undesired gas constituents by using an absorption means in the laser gas circuit. The use of an absorption means was intended to reduce the demand for fresh gas. The use of such an absorption means, however, produced undesirable side effects and altered the operation of the gas laser itself. In addition, the absorption means used in the prior art tends to become quickly saturated and regeneration of the absorber is difficult.

SUMMARY OF THE INVENTION

It is the main object of the present invention to improve a gas laser with respect to being able to reduce the fresh gas demand without causing uncontrollable side effects on the gas laser.

For solving this problem the gas laser of the present invention is characterized by a water vapor condenser or freeze-out means located in the laser gas circuit. When the laser gas is flowing through the condenser, only the water vapor is removed from the laser gas. Using this approach, the laser output power is maximized.

Up-to-now, the general opinion was that several constituents of the gas penetrating into the laser gas circuit by leakage were responsible for the decrease in the laser output. This thinking was a primary reason for using more complex absorption systems for removing foreign gases to the highest possible degree. This invention, however, is based on the finding that water vapor alone is the primary reason for the reduction of the laser output. Accordingly, the unwanted power degradation due to the inward leakage of gas can be prevented almost entirely by specifically removing only the water vapor portion of the leakage gas.

According to an advantageous embodiment of the present invention the gas laser is characterized in that the condenser means is located in a by-pass line of the laser gas circuit. By this arrangement, only a portion of the entire amount of laser gas of the laser gas circuit flows through the condenser during each cycle. It has been found that this approach will remove a sufficient amount the water vapor from the gas.

According to a further advantageous embodiment of the present invention, a throttle valve is provided in the by-pass line, upstream from the condenser means, and in the direction of flow of the laser gas. The throttle valve permits the amount of laser gas passing through the by-pass line and the condenser means to be controlled.

According to a further advantageous embodiment of the present invention, a pair of valves are provided in the by-pass line on both sides of the condenser means. By closing these valves, the by-pass line can be closed off so that it will be possible to defrost the condenser means without being forced to effect the rest of the laser gas circuit.

According to a further advantageous embodiment of the present invention, the gas laser includes a rinsing line, coming from the gas supply line, and connected to the by-pass line. In addition, the by-pass line is connected to the outlet line. When defrosting the condenser means, it can be rinsed with fresh laser gas via the rinsing line so that the water vapor can be almost entirely removed from the condenser means in a particularly simple manner.

According to a further advantageous embodiment of the present invention, the gas laser is characterized in that the inlet and outlet of the by-pass line are located between a circulation pump of the laser gas circuit and the outlet of the feed line. Thus, the by-pass line is located on the high-pressure side of the circulation pump and prior to the fresh gas supply. This position results in maximizing the efficiently of the condenser means, since the water vapor partial pressure in the laser gas is highest at this location in the circuit.

According to a further advantageous embodiment of the present invention, the gas laser is characterized in that the condenser means includes a cooling coil arranged in a vacuum vessel.

According to a further advantageous embodiment of the present invention, the gas laser is characterized in that a defroster means is provided for in the condenser means.

Finally, according to a further advantageous embodiment of the present invention, the gas laser is provided with a gas ballast pump for evacuating the laser. The gas ballast pump guarantees that the water vapor will be properly removed from the condenser means.

An embodiment of the invention will now be described with reference to the drawings.

DETAILED DESCRIPTION OF THE PREFERRED EMBODIMENT

Figure 1:
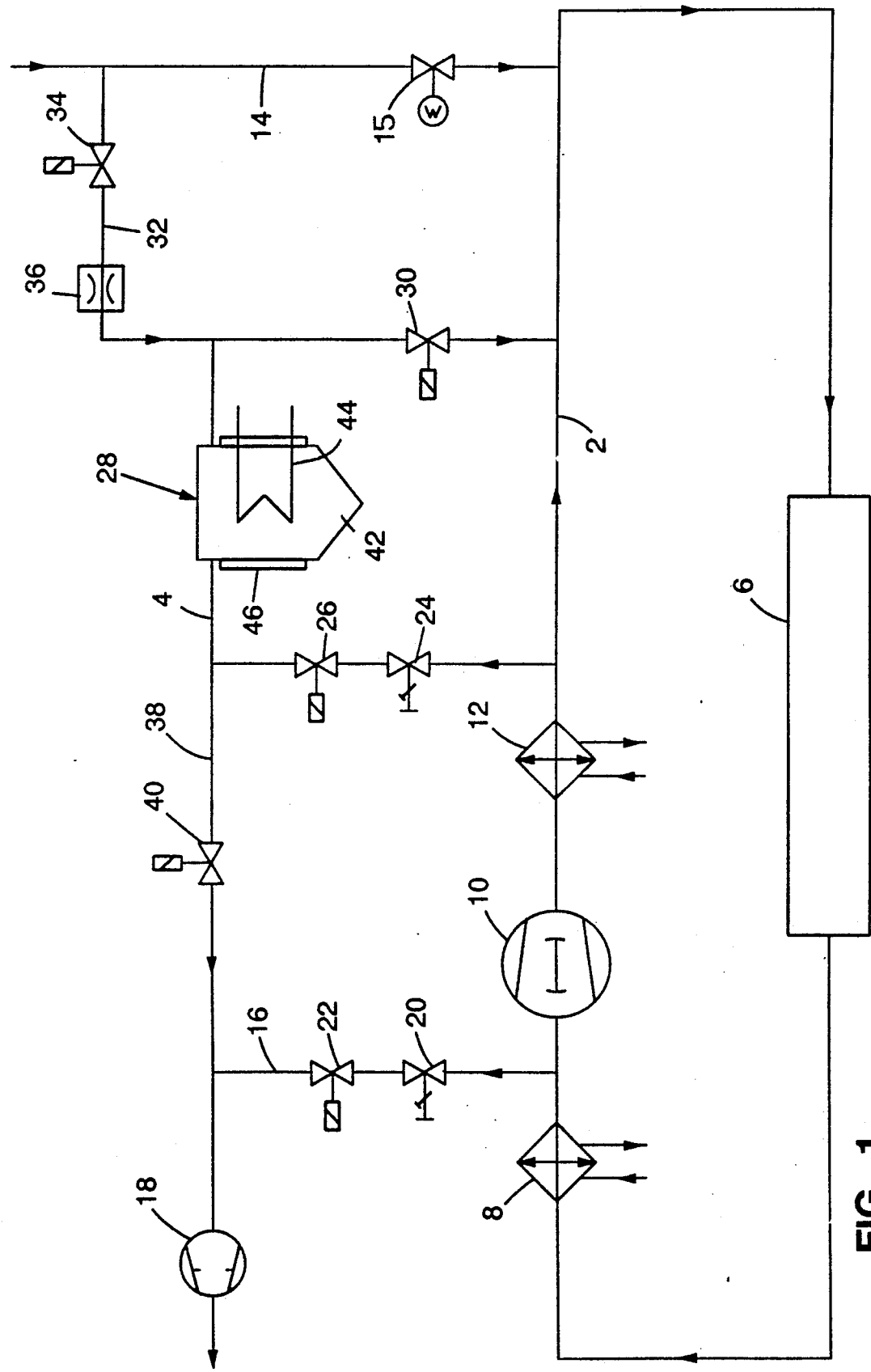
FIG. 1 is a circuit diagram of a gas laser formed in accordance with the subject invention.

According to FIG. 1, the laser gas circuit includes a circular line 2 and a by-pass line 4. A resonator 6, a heat exchanger 8, a circulation pump 10 in this case being a Roots pump, and a further heat exchanger 12 are arranged in the circular line 2 in this sequence in the direction of flow of the laser gas in the circular line 2. A feed line 14 comprising a throttle valve 15 ends with its outlet into the circular line 2 prior to the resonator 6 in the direction of flow. An outlet line 16 leads from the circular line 2 between the heat exchanger 8 and the circulation pump 10 to a pump 18 through which the exhaust laser gas is pumped off. A throttle valve 20 and a valve 22 are located in the outlet line 16.

The by-pass line 4 branches behind the heat exchanger 12, seen in direction of flow of the laser gas, through an inlet from the circular line 2 and leads via a throttle valve 24, a valve 26, a water vapor separator or condenser means 28 and a valve 30 at one outlet back to the circular line 2. The by-pass line 4 is connected to the feed line 14 via a rinsing line 32 comprising a valve 34 and a throttle means 36. The rinsing line 32 ends in the by-pass line 4 between the freeze-out means 28 and the valve 30 located therebehind. The by-pass line 4 is connected to the outlet line 16 via an outflow line 38, the outflow line 38 branching from the by-pass line 4 between the condenser means 28 and the valve 26 and the outlet line 16 ending between the valve 22 and the pump 18. The outflow line 38 includes a valve 40.

The condenser means 28 is defined by a vacuum vessel 52 having a cooling coil 44 mounted therein. A defroster means 46 is provided in form of a radiator, opposite to the cooling coil 44.

In normal operation of the laser, the valves 34 and 40 are closed and the laser gas is circulated by the pump 10 in the circular line 2. A portion of the gas is also circulated through the by-pass line 4. Laser gas to be exchanged is sucked off from the circular line 2 through the throttle valve 20 being set to minimum gas consumption using the pump 18. A corresponding amount of fresh gas is supplied to the circular line 2 through the throttle valve 15. The valves 22, 26 and 30 are open and the rate of flow in the by-pass line is adjusted by means of the throttle valve 24. The water vapor contained in the laser gas flowing through the by-pass line 4 is partially separated off at the cooling coil 44. In this arrangement, the water vapor portion in the laser gas in the laser gas circuit is reduced to such a degree that the fresh gas supply can be reduced to a minimum or omitted all together.

The water frozen out at the cooling coil 44 has to be removed from time to time to make sure that the cooling coil maintains its required efficiency. For defrosting, the condenser means 28 is switched off and the valves 22, 26 and 30 are closed. Through the valve 34 and the throttle means 36 the vessel 42 is aerated with fresh laser gas at atmospheric pressure. The defroster means 46 which may include a radiator and/or a hot air blower is switched on and heats up the vessel 42. The heating will serve to defrost the cooling coil 44 so that after a short period of time, the water contained in the condenser means 28 is in liquid state. Thereupon, the valve 34 is closed and the valve 40 is opened. The pump 18 then pumps off the water vapor and the gas contained in the vessel 42. At this stage, the pressure in the container 42 is below the vapor saturation pressure of the water with respect to the temperature, so that the water vapor can be pumped off completely. To achieve this result, the pump 18 must be able to handle water vapor. A suitable pump is a gas ballast pump.

After the first phase of pumping out the water vapor is completed, the valve 40 is closed and the valve 34 is opened. The vessel 42 is again flooded. Thereupon, the valve 34 is closed and the valve 40 is opened again and once more a pumping-off operation is effected by the pump 18. This operation may be repeated several times to insure that virtually all of the water vapor is removed from the vessel 42. Thereupon, the valve 40 is closed again and the condenser means is switched on. The valves 26 and 30 are opened again so that the laser can again be operated in the above-described normal operation.

Figure 2:
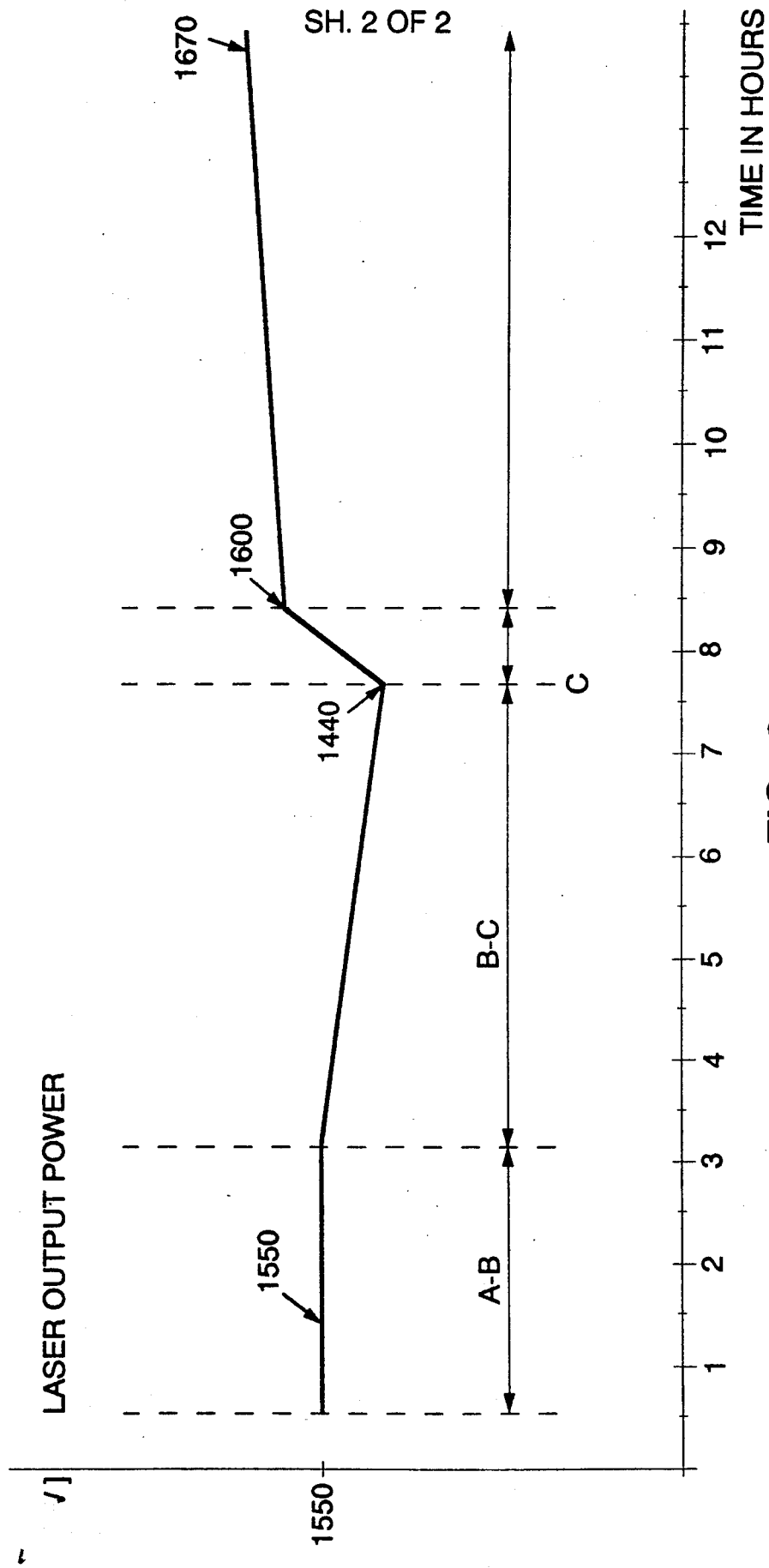
FIG. 2 is a graphical representation showing the effect of the condenser on the laser output.

FIG. 2 shows the effects of the water vapor condenser means 28 in a $CO_2$ high-performance laser with an optimal output of about 1,500 Watts. The course of the graph in section A-B shows the laser output in normal operation with fresh gas supply and without switching on the condenser means 28. During this stage, the laser output was about 1,550 Watt. At point B, the fresh gas supply was switched off and the valve 20 was closed. Thereupon, the laser output dropped to about 1,440 Watts over a period of less than five hours up to point C. At point C, the condenser means of the subject invention was switched on. As can be seen, the laser output rapidly rose increasing to about 1,600 Watts. After point D, the laser was further operated with the condenser means being switched on, and the laser output gradually increased to between 1,640 to 1,670 Watts. From point C on, no fresh gas was supplied, so that the measuring curve shows that with the aid of the condenser means, the water vapor in the laser gas circuit is reduced to such a degree that the optimal output can be maintaining without adding a fresh supply of gas. In practice it may, however, nevertheless be desirable to retain the fresh gas supply on a minimum level. By this arrangement, the optimal output of the laser can be enhanced.

What is claimed is:

1. A gas laser comprising:
    a laser resonator;
    gas circuit means for circulating a lasing gas through the laser resonator, said gas circuit means including a by-pass line having an inlet and an outlet connected to said gas circuit means; and
    means for condensing and removing water vapor from the lasing gas in the gas circuit means, said condenser means being located in said by-pass line.

2. A laser as recited in claim 1 wherein said by-pass line further includes a throttle valve, located upstream from said condenser means, said throttle valve for controlling the amount of lasing gas passing through the by-pass line.

3. A laser as recited in claim 1 wherein said bypass line includes a pair of valves, with said condenser means being located between said valves such that the condenser means can be isolated from the lasing gas circulating in the gas circuit means.

4. A laser as recited in claim 3 further including a supply line having an inlet to said gas circuit means, said supply line for adding fresh lasing gas to said gas circuit means, said supply line being connectable to said by-pass line for evacuating water vapor from the condenser means when it is isolated from the gas circuit means by said valves.

5. A laser as recited in claim 4 wherein said gas circuit means includes a pump means for circulating the lasing gas and wherein the inlet and the outlet of the by-pass line are located between the pump means and the inlet of said supply line.

6. A laser as recited in claim 4 further includes a means for evacuating laser gas from the gas circuit means, said means including a gas ballast pump.

7. A laser as recited in claim 1 wherein said condenser means includes a defroster means.

8. A method of operating a gas laser having a gas circuit for circulating a lasing gas comprising the steps of:
   channeling a portion of the circulating lasing gas into a by-pass line; and
   removing water vapor from the lasing gas in the by-pass line by condensation using condensing means.

9. A method as recited in claim 8 further including the step of regulating the amount of lasing gas flowing in the by-pass line.

* * * * *